(12) United States Patent
Kim et al.

(10) Patent No.: US 8,521,678 B2
(45) Date of Patent: Aug. 27, 2013

(54) LEARNING CONTROL SYSTEM AND LEARNING CONTROL METHOD

(75) Inventors: Chyon Hae Kim, Wako (JP); Hiroshi Tsujino, Wako (JP); Hiroyuki Nakahara, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 491 days.

(21) Appl. No.: 12/792,853

(22) Filed: Jun. 3, 2010

(65) Prior Publication Data

US 2010/0318480 A1    Dec. 16, 2010

(30) Foreign Application Priority Data

Jun. 12, 2009    (JP) .................................. 2009-141680

(51) Int. Cl.
*G06F 17/00*    (2006.01)
*G06N 5/02*    (2006.01)

(52) U.S. Cl.
USPC .......................................................... 706/51

(58) Field of Classification Search
USPC .......................................................... 706/50
See application file for complete search history.

(56) References Cited

FOREIGN PATENT DOCUMENTS

| JP | 2000-020494 | 1/2000 |
|----|-------------|--------|
| JP | 2002-189502 | 7/2002 |

OTHER PUBLICATIONS

Q-Learning for Robot Control: A thesis submitted for the degree of Doctor of Philosophy of The Australian National University. Chris Gaskett Bachelor of Computer Systems Engineering H1 (RMIT University) Bachelor of Computer Science (RMIT University) Supervisor: Professor Alexander Zelinsky 2002.*
Advance Motion Acquisition of an Actual Robot by Reinforcement Learning using Reward Change Ryota Yamashina *4, Haruhisa Motoyama, Mariko Urakawa, Jian Huang and Tetsuro Yabuta Dept. of Mechanical Engineering, Graduate School of Engineering, Yokohama National University, 79-5 Tokiwadai, Hodogaya-ku, Yokohama, 240-8501 Japan.*

* cited by examiner

*Primary Examiner* — Kakali Clark
*Assistant Examiner* — Ababacar Seck
(74) *Attorney, Agent, or Firm* — Squire Sanders (US) LLP

(57) ABSTRACT

A learning control system according to the present invention is one which performs learning of action values of actions in an apparatus which identifies its state as one of predetermined states, and selects an action based on the obtained action values and the identified state. The learning control system includes n action value learning devices including the first to the n th learning devices which perform learning of n action values from $Q_1$ to $Q_n$, assuming that n is a positive integer and an action value determining device which determines the total action value of an action Q of each state based on outputs of the n action value learning devices. In the learning control system, the first target value of the first action value learning device is determined based on the reward r obtained after an action has been carried out by the next state and a total action value Q' that was prepared for the action selection in the next state, and the first learning device updates the first action value $Q_1$ using the first target value. When n is 2 or more, the n-th a target value of the n th action value learning device is set to the difference between the (n−1) th target value of the (n−1) th learning device and the action value $Q_{n-1}$, and the n th learning device updates the n th action value $Q_1$ using the n th target value.

9 Claims, 8 Drawing Sheets

LEARNING CONTROL SYSTEM AND LEARNING CONTROL METHOD

BACKGROUND OF THE INVENTION

1. Field of the Invention

The present invention relates to learning control systems and learning control methods using reinforcement learning.

2. Background Art

Reinforcement learning is known as a method of learning for a mechanical or computational system in which learning of action rules of agents including persons and animals is performed and the mechanical or computational system's control rules are adapted to achieve its own target. For example, Japanese Patent No. 3465236 can be referred to. Reinforcement learning is used in a robot which takes actions in an unknown environment, for example. However, there exists a problem that learning efficiency of reinforcement learning is low and therefore it takes long for learning.

On the other hand, multi-agent reinforcement learning (MARL) in which kinds of actions to be taken by agents are previously determined before learning is performed has been developed. The previous determination of the kinds of actions improves learning efficiency. For example, Japanese Patent Application Laid Open No. 2000-20494 can be referred to. However, to utilize MARL, the kinds of actions to be taken by agents have to be previously known, and therefore MARL cannot be performed based only on the information obtained by the observation of the states of the agents. Thus, MARL cannot be applied to the cases in which the kinds of actions to be taken by agents cannot be previously determined due to lack of prior knowledge. Accordingly, MARL can hardly be applied to real environments including agents.

Thus, there is a need for a highly efficient reinforcement learning system and a highly efficient reinforcement learning method which can be applied to the real environments including agents without prior knowledge.

SUMMARY OF THE INVENTION

A learning control system based on the first aspect of the present invention is one which performs learning of action values of actions in an apparatus which identifies its state as one of predetermined states, and selects an action based on the obtained action values and the identified state. The learning control system based on the first aspect of the present invention includes n action value learning devices including the first to the n th learning devices which perform learning of n action values from $Q_1$ to $Q_n$, respectively assuming that n is a positive integer, and the action values determine the total action value of an action Q of each state based on the n action values of the n action value learning devices. In the learning control system based on the first aspect of the present invention, the first target value of the first action value learning device is determined based on the reward r that is obtained after an action has been carried out by the next state and a total action value Q' that was prepared for the action selection in the next state, and the first learning device updates the first action value $Q_1$ using the first target value. When n is 2 or more, the n-th target value of the n th action value learning device is set to the difference between the (n−1) th target value of the (n−1) th learning device and the action value $Q_{n-1}$, and the n th learning device updates the n th action value $Q_n$ using the n th target value.

According to the learning control method based on the first aspect of the present invention, an apparatus identifies a state of the apparatus as one of predetermined states obtains action values of actions in the identified state and selects an action based on the action values. Assuming that n is a positive integer, learning of n action values $Q_1$ to $Q_n$ is performed and learning of the total action value of an action Q of each state is performed based on the n action values obtained by the learning. According to the learning control method based on the first aspect of the present invention, the first target value is determined based on the reward r obtained after an action has been carried out by the next state and action value Q' that was prepared for the action selection in the next state, and the first action value $Q_1$ is updated using the first target value. When n is 2 or more, the n-th target value of the n th action value learning device is set to the difference between the (n−1) th target value of the (n−1) th learning device and the action value $Q_{n-1}$, and the n th action value $Q_n$ is updated using the n th target value.

According to the first aspect of the present invention, the n-th target value of the n th action value learning device is set to the difference (also referred to as a residual) between the (n−1) th target value of the (n−1) th learning device and the action value $Q_{n-1}$ and thus the first to the n-th learning devices arranged in series are automatically operated in different ways, resulting in improving learning efficiency. Accordingly, a highly efficient reinforcement learning system and a highly efficient reinforcement learning method are obtained, which can be applied to the real environment including agents without prior knowledge. The phrase "automatically operated in different ways" means such a configuration as described below. An action value learning device with a smaller index of indexes 1 to n is configured to learn what can be learned by the action value learning device with the smaller index while an action value learning device with a greater index is configured to learn, as a residual, what cannot be learned by the action value learning device with the smaller index.

In an embodiment of the first aspect of the present invention, a learning coefficient, the n th target value, an update amount of action value $Q_n$ and a coefficient for correcting $Q_n$ are represented respectively as $\alpha_n$, $T_n$, $\Delta Q_n$ and $A_n$, and the following expressions are held when n is two or more.

$$\Delta Q_n = \alpha_n(T_n - A_n Q_n)$$

$$T_n = (1 - \alpha_{n-1})(T_{n-1} - A_{n-1} Q_{n-1})$$

$$A_n = \frac{\sum_{p}^{n} \alpha_p \prod_{q=1}^{p-1} (1 - \alpha_q)}{\alpha_n}$$

According to the present embodiment, n kinds of learning can be performed consistently.

A learning control system based on the present invention can also be configured as below.

A learning control system based on the second aspect of the present invention is one which performs learning of action values of actions in an apparatus which identifies its state as one of predetermined states, and selects an action based on the obtained action values and the identified state. The learning control system based on the aspect of the second aspect of the present invention includes n action value learning devices including the first to the n th learning devices which perform learning of n action values from $Q_1$ to $Q_n$, respectively assuming that n is a positive integer. And an action value determining device determines action value of an action Q of each state based on the n action values of the n action value learning devices. In the learning control system based on the second aspect of the present invention, a target value of the total action value is determined based on the reward r obtained after an action has been carried out by the next state and action value Q' that was prepared for the action selection in the next state. The n-th target value of the n th action value learning device is set to a value which is obtained by subtracting the sum of action values obtained by learning of action value learning devices other than the n th action value learning device from the target value of the total action value of an action and the n th action value learning device updates the n th action value $Q_n$ using the n th target value.

According to a learning control method based on the second aspect of the present invention, an apparatus identifies the state of the apparatus as one of predetermined states obtains the action values of actions in the identified state, and selects an action based on the action values. Assuming that n is a positive integer, learning of n action values $Q_1$ to $Q_n$, is performed and learning of action value of an action Q of each state is performed based on the n action values obtained by the learning. According to a learning control method based on the second aspect of the present invention, a target value of the total action value is determined based on the reward r obtained after an action has been carried out by the next state and action value Q' that was prepared for selection in the next state. The n-th target value of the n th action value learning device is set to a value which is obtained by subtracting the sum of action values obtained by learning of action value learning devices other than the n th action value learning device from the target value of the total action value of an action, and the n th action value learning device updates the n th action value $Q_n$ using the n th target value.

According to the second aspect of the present invention, the n-th target value of the n th action value learning is set to a value which is obtained by subtracting sum of action values obtained by learning of action value other than the n th action value learning from the target value of the total action value of an action and therefore the first to the n-th kinds of learning are automatically operated in different ways, resulting in improving learning efficiency. Accordingly, a highly efficient reinforcement learning system and a highly efficient reinforcement learning method are obtained, which can be applied to the real environment including agents without prior knowledge.

In an embodiment of the second aspect of the present invention, a learning coefficient, the n th target value and an update amount of the action value $Q_n$ are represented respectively as $\alpha_n$, $T_n$, and $\Delta Q_n$. The following expressions are held.

$$\Delta Q_n = \alpha_n (T_n - Q_n)$$
$$T_n = T_0 - \sum_{k \neq n} Q_k$$

According to the present embodiment, n kinds of learning can be performed consistently.

In an embodiment of the present invention, the apparatus identifies the state of the apparatus as one of predetermined states and obtains the reward r based on information on the environment, agents, and the apparatus itself.

According to the embodiment, information on the environment, agents, and the apparatus itself is reflected on the state of the apparatus and the reward.

In an embodiment of the present invention, a state of an agent is predicted when the agent does not take an action and an action of the agent is picked up using a difference between the agent's state which has been predicted in the past and the agent's state obtained thorough information from the observation.

According to the embodiment, an action of the agent is picked up as the agent's action and therefore a state of the apparatus can be identified with higher accuracy.

In an embodiment of the present invention, learning is performed using action value $Q_k$ that was determined from the agent's state at the current time and action value $Q_k'$ that was determined from the picked up action of the agent besides the agent's state determined based on the information at the current time.

According to the embodiment, learning is performed using action value $Q_k$ and action value $Q_k'$. Therefore the agent's state can be reflected on the action values more efficiently.

DETAILED DESCRIPTION OF THE INVENTION

Figure 1:
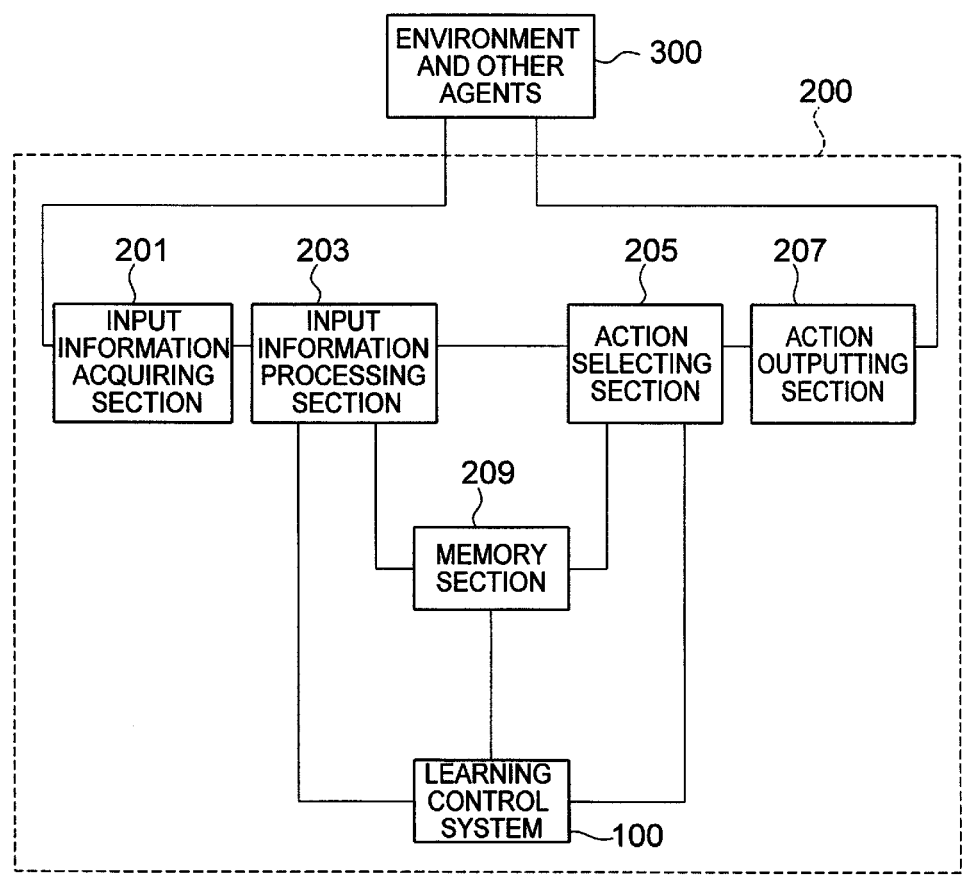
FIG. 1 illustrates a configuration of an apparatus including a learning control system according to an embodiment of the present invention.

FIG. 1 illustrates a configuration of an apparatus 200 including a learning control system 100 according to an embodiment of the present invention. The apparatus 200 may be a robot, for example. The apparatus 200 includes an input information acquiring section 201, an input information processing section 203, an action selecting section 205, an action outputting section 207, a memory section 209 and a learning control system 100.

The input information acquiring section 201 acquires information from the environment and other agents 300 and acquires information on condition of the apparatus 200 itself. When the apparatus 200 is a robot, the input information acquiring section 201 may include a camera and may acquire information of the environment and other agents 300 using pictures taken with the camera. Further, the input information acquiring section 201 may acquire information on condition of the apparatus 200 including a position and an orientation of the robot as described later. The input information acquiring section 201 sends the information thus acquired to the input information processing section 203.

The input information processing section 203 identifies the state of the apparatus 200 as one of the predetermined states according to the acquired information on conditions of the environment, other agents and the apparatus.

The learning control system 100 performs learning of action values in each state of the apparatus 200 which has been identified by the input information processing section 203. For learning of action value, reward is used. Reward is an evaluation measured by the extent that the apparatus achieves its objective. Reward is obtained by the input information processing section 203. Action value is a time-weighted expectation of reward to be expected when a certain action is taken in a certain state. Operation of the learning control system 100 will be described later.

The memory section 209 stores action values obtained by learning of the learning control system 100.

The action selecting section 205 obtains action values of actions that can be be selected in the state of the apparatus 200 which has been identified by the input information processing section 203 and selects one of the actions based on the obtained action values. Operation of the action selecting section 205 will be described later. The action selecting section 205 sends data of the selected action to the action outputting section 207.

The action outputting section 207 controls actuators in such a way that the selected action is carried out. The action output by the action outputting section 207 affects other agents as described below. Further, for example, when the apparatus moves, a positional relationship between the apparatus and the environment will change accordingly and therefore the observed state of the environment of the apparatus 200 will also change.

Figure 2:
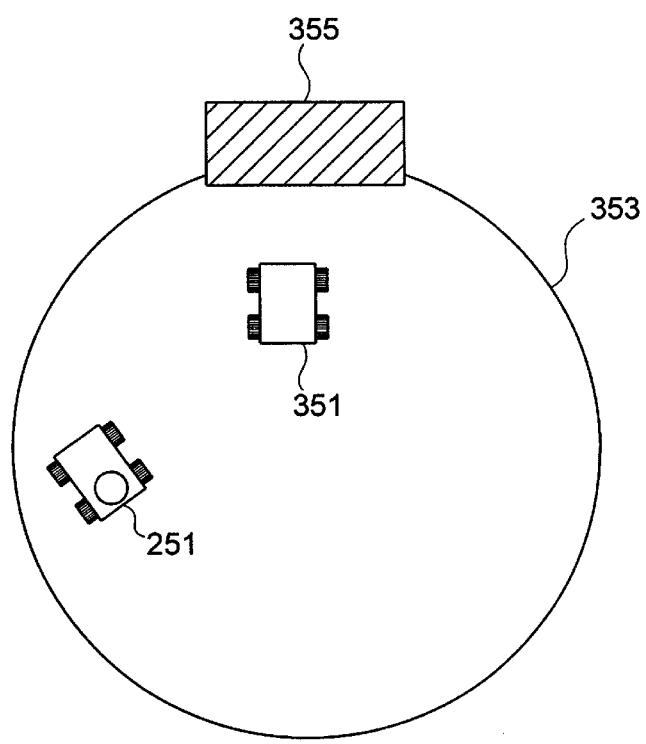
FIG. 2 illustrates an example to which the apparatus 200 provided with the learning control system according to the embodiment is applied.

FIG. 2 illustrates an example to which the apparatus 200 provided with the learning control system 100 according to the embodiment is applied. In this case, the apparatus is a guiding robot 251. The guiding robot 251 and a guided robot 351 which is the other agent are put in a field 353 which is the environment. The guiding robot 251 carries out task to guide the guided robot 352 into a goal frame 355 which is a part of the environment. By way of example, the guided robot 351 is designed to move at random and to move away from the guiding robot 252 when the guiding robot 251 is within a predetermined distance from it. The guiding robot 252 processes images taken by the camera set on the head and acquires input information on the guided robot 351 which is the other agent and the goal frame 355 which is a part of the environment. Further, the guiding robot 251 acquires data of angle of the head provided with the camera (angle of the neck), using an encoder or the like. The guiding robot 252 performs learning of a way for guiding the guided robot 351 into the goal frame 355, based on information on the other agent, the environment and the guiding robot itself.

Table 1 shows an example of input information on conditions.

TABLE 1

| | |
|---|---|
| Information on itself | Neck angle of the guiding robot |
| | Position of the guiding robot |
| | Orientation of the guiding robot |
| Information on the other agent | Horizontal position of center of gravity of the guided robot |
| | Orientation of the guided robot |
| Information on the environment | Horizontal position of center of gravity of the goal frame |
| | Horizontal positions of left and right ends of the goal frame |

The input information processing section 203 of the guiding robot 251 identifies the state of the guiding robot 251 as belonging to one of a plurality of predetermined states based on information on conditions of the environment, the other agent and itself.

The action selecting section 205 of the guiding robot 251 obtains action values of actions which can be selected in the state identified by the input information processing section 203. Then, based on the results, the action selecting section 205 selects the action with the highest action value. Each action value is determined for a combination of a state identified by the input information processing section 203 and an action, and then stored in the memory section 209.

Table 2 shows a table for storing actions of the guiding robot 251 which can be selected. The table is stored in the memory section 209.

TABLE 2

| Action selection No. | Description of action |
|---|---|
| 0 | Stop |
| 1 | Go ahead to the other |
| 2 | Go around the other (CW) |
| 3 | Go around the other (CCW) |
| 4 | Go away from the other |
| 5 | Move the neck to look for the other |
| 6 | Go away from the goal frame |
| 7 | Move the neck to look for the goal frame |

Figure 3:
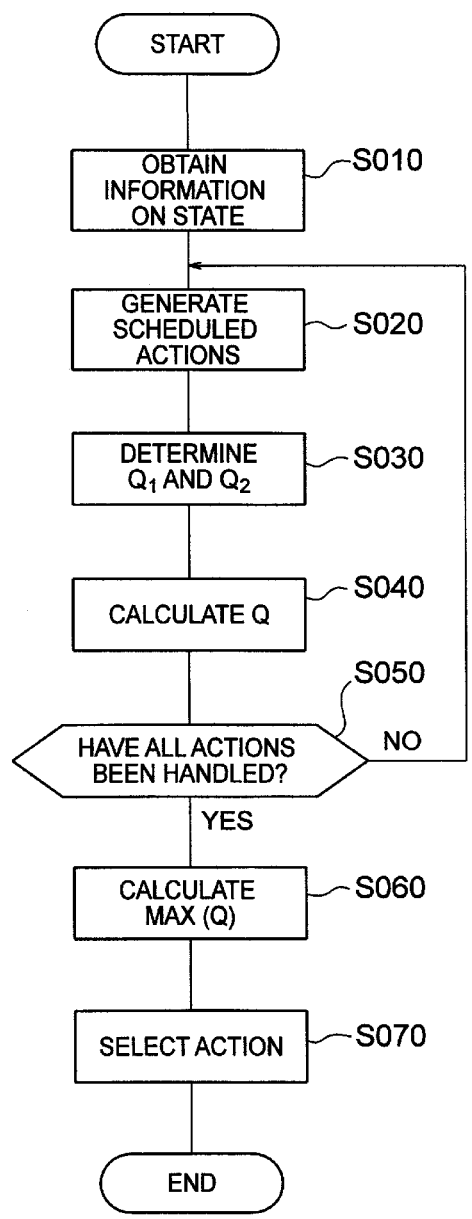
FIG. 3 is a flowchart showing a method for selecting an action according to the present embodiment.

FIG. 3 is a flowchart showing a method for selecting an action according to the present embodiment.

In step S010 of FIG. 3, the action selecting section 205 receives information on the state from the input information processing section 203.

In step S020 of FIG. 3, the action selecting section 205 obtains scheduled actions. By way of example, the action selecting section 205 obtains scheduled actions from Table 2.

In step S030 of FIG. 3, the action selecting section 205 generates action values $Q_1$ and $Q_2$ of each of the scheduled actions in the current state. Action values $Q_1$ and $Q_2$ will be described later.

In step S040 of FIG. 3, the action selecting section 205 calculates the total action value of an action Q of each of the scheduled actions from action values $Q_1$ and $Q_2$. The total action value Q will be described later.

In step S050 of FIG. 3, the action selecting section 205 determines whether all actions have been handled or not. If all actions have not been handled, the process returns to step S020. If all actions have been handled, the process goes to S060.

In step S060 of FIG. 3, the action selecting section 205 determines which action has the maximum action value.

In step S070 of FIG. 3, the action selecting section 205 selects the action having the maximum action value.

Operation of the input information processing section 203 related to learning by the learning control system 100 and a learning method of the learning control system 100 will be described below.

As described above, an action is selected in a state by the action selecting section 205 (step S070 of FIG. 3). Then, the selected action is carried out by the action outputting section 207. After the action has been completed, the input information acquiring section 201 acquires data on the apparatus itself, other agents and the environment. Then, the input information processing section 203 performs the following process.

Figure 4:
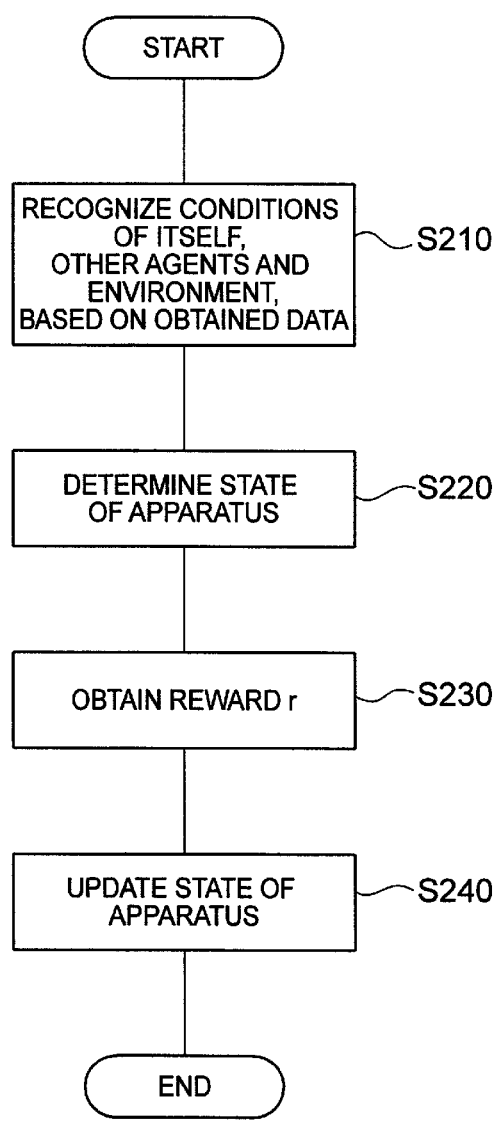
FIG. 4 is a flowchart showing the process performed by the input information processing section.

FIG. 4 is a flowchart showing the process performed by the input information processing section 203.

In step S210, the input information processing section 203 recognizes conditions of itself, other agents and the environment based on the data described above.

In step S220, the input information processing section 203 identifies the state of the apparatus as belonging to one of the groups of states of the apparatus based on the conditions of itself, other agents and the environment.

In step S230, the input information processing section 203 obtains the reward r based on the conditions of itself, other agents and the environment. By way of example, when the guided robot 351 and the goal frame 355 are aligned on the image of the camera (Condition 1), the reward of 0.1 is given. When the guiding robot 251 starts to move rectilinearly under Condition 1 (Condition 2), the reward of 1 is given. When the guided robot 351 is determined to be in the goal frame 355 on the image of the camera (Condition 3), the reward of 10 is given.

In step S240, the input information processing section 203 updates the state of the apparatus. Then, the action selecting section 205 selects an action in the newly updated state of the apparatus (the flowchart shown in FIG. 3).

Figure 5:
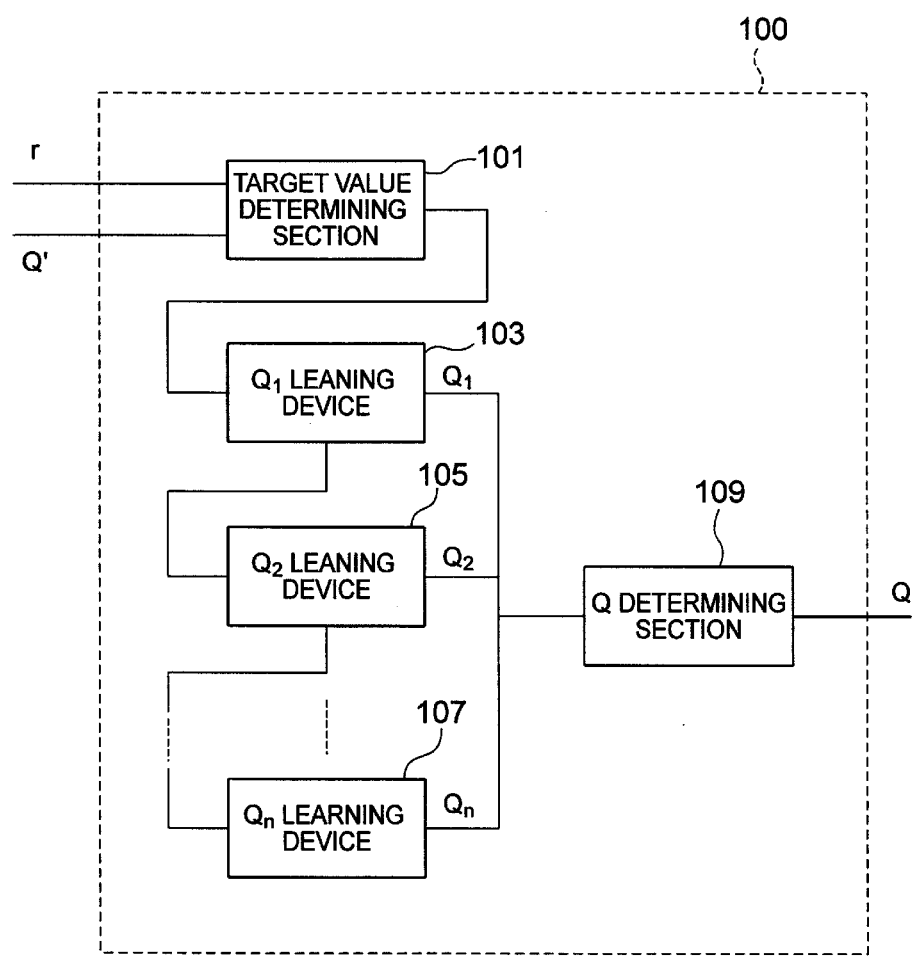
FIG. 5 illustrates a configuration of the learning control system.

FIG. 5 illustrates a configuration of the learning control system 100. The learning control system 100 is provided with a target value determining section 101, $Q_1$ action value learning device 103, $Q_2$ action value learning device 105, ... $Q_n$ action value learning device 107 and Q determining section 109. An action value learning device will be referred to as a learning device hereinafter. $Q_i$ learning device retrieves action value $Q_i$ stored in the memory section 209, updates it in the way described below and stores the updated $Q_i$ in the memory section 209. As described later, learning is performed by the learning control system after the state has changed and an action to be selected in a new state has been determined.

The target value determining section 101 obtains the reward r from the input information processing section 203, obtains an action value Q' of the action that was prepared for the action selection in the next state from the action selecting section 205 and determines a target value of the $Q_1$ learning device 103 according to the following expression.

$$r + \gamma Q' \quad (1)$$

γ is discount rate. Discount rate is a coefficient for evaluating reward to be obtained in a future by discount. The more distant the time when reward is obtained is, the larger the discount is. Discount rate is a value which is equal to or greater than 0 and is equal to or smaller than 1. In the present embodiment, discount rate is set to 0.7 empirically.

$Q_1$ learning device 103 updates action value $Q_1$ according to the following expression assuming that an update amount of action value $Q_1$ is represented as $\Delta Q_1$ $$\Delta Q_1 = \alpha(r + \gamma Q' - Q_1) \quad (2)$$

α is a learning coefficient and a value which is equal to or greater than 0 and is equal to or smaller than 1.

$Q_2$ learning device 105 updates action value $Q_2$ according to the following expression assuming that an update amount of action value $Q_2$ is represented as $\Delta Q_2$.

$$\Delta Q_2 = \beta\left((1-\alpha)(r + \gamma Q' - Q_1) - \frac{\alpha + \beta - \alpha\beta}{\beta}Q_2\right) \quad (3)$$

β is a learning coefficient and a value which is equal to or greater than 0 and is equal to or smaller than 1. It should be noted that a difference between the target value of action value and the output value of action value in $Q_1$ learning device 103 (that is, a residual)

$$(1-\alpha)(r + \gamma Q' - Q_1)$$

is set to the target value of $Q_2$ learning device 105.

In general, $Q_n$ learning device 107 updates action value $Q_n$ according to the following expressions, assuming that n is an integer which is two or more, a learning coefficient is represented as $\alpha_n$, the n-th target value is represented as $T_n$, an update amount of action value $Q_n$ is represented as $\Delta Q_n$, and a coefficient for correcting $Q_n$ is represented as $A_n$.

$$\Delta Q_n = \alpha_n(T_n - A_n Q_n) \quad (4)$$

$$T_n = (1 - \alpha_{n-1})(T_{n-1} - A_{n-1}Q_{n-1}) \quad (5)$$

$$A_n = \frac{\sum_{p}^{n} \alpha_p \prod_{q=1}^{p-1}(1 - \alpha_q)}{\alpha_n} \quad (6)$$

It should be noted that a difference $T_n$ between the target value of action value and the output value of action value in $Q_{n-1}$ learning device (that is, a residual) is set to the target value of $Q_n$ learning device 109. Thus, in the present embodiment, action value $Q_n$ is updated according to the updating rule of Expressions (4) and (5) and therefore the first to the n-th learning devices arranged in series are automatically operated in different ways, resulting in improving learning efficiency.

Alternatively, $Q_n$ learning device 107 may update action value $Q_n$ according to the following expressions, assuming that n is an integer which is two or more, a learning coefficient is represented as $\alpha_n$, the n-th target value is represented as $T_n$ and an update amount of action value $Q_n$ is represented as $\Delta Q_n$.

$$\Delta Q_n = \alpha_n(T_n - Q_n) \quad (7)$$

$$T_n = T_0 - \sum_{k \neq n} Q_k \quad (8)$$

In Expression (8), $T_o$ is a target value of the total action value of an action and is obtained by Expression (1). The n-th learning device performs learning based on the n-th target value which is a residual obtained by subtracting the sum of action values for which learning has been performed by other learning devices than itself from the target value $T_o$ of the total action value according to Expression (7). In this embodiment, action value $Q_n$ is updated according to the updating rule of Expressions (7) and (8) and therefore the first to the n-th learning devices are automatically operated in different ways, resulting in improving learning efficiency.

Q determining section 109 determines Q by obtaining the sum of $Q_1, Q_2, \ldots Q_n$.

Figure 6:
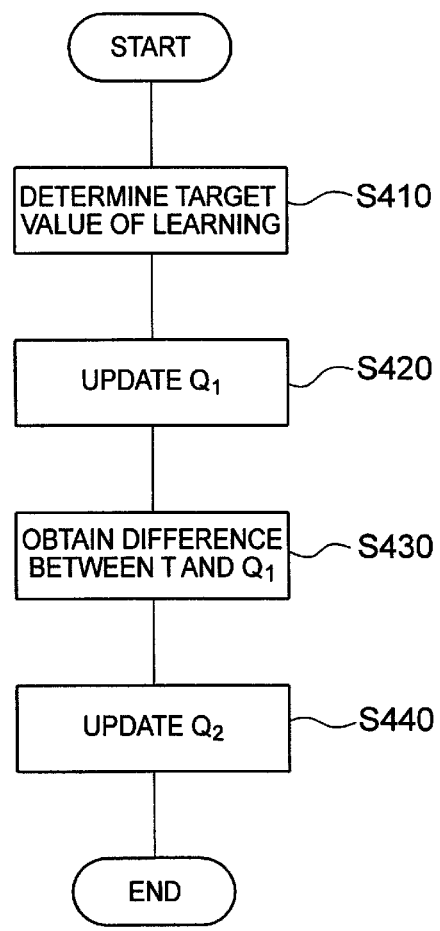
FIG. 6 shows a flowchart showing a learning process performed by the learning control system.

FIG. 6 shows a flowchart showing a learning process performed by the learning control system 100. In the present embodiment, the learning control system 100 contains two learning devices, $Q_1$ learning device 103 and $Q_2$ learning device 105. The learning control system 100 starts the process of learning after the input information processing section 203 has updated the state of the apparatus.

In step S410 of FIG. 6, the target value determining section 101 obtains the reward r from the input information processing section 203 as described above and obtains a total action value Q' of the action that was prepared for the action selection in the next state from the action selecting section 205. Then, the target value determining section 101 determines target value T of $Q_1$ learning device 103 according to the following expression.

$$r + \gamma Q' \quad (1)$$

In step S420 of FIG. 6, $Q_1$ learning device 103 updates action value $Q_1$ according to the following expression as described above.

$$\Delta Q_1 = \alpha(r + \gamma Q' - Q_1) = \alpha(T - Q_1) \quad (2)$$

Updated action value $Q_1$ is stored in the memory section 209.

In step S430 of FIG. 6, the target value determining section 101 sets a difference between the target value T and the updated $Q_1$ as a target value of $Q_2$ learning device 105 as described above.

In step S440 of FIG. 6, $Q_2$ learning device 105 updates action value $Q_2$ according to the following expression as described above.

$$\Delta Q_2 = \beta\left((1-\alpha)(r + \gamma Q' - Q_1) - \frac{\alpha + \beta - \alpha\beta}{\beta}Q_2\right) \quad (3)$$

Updated action value $Q_2$ is stored in the memory section 209.

Although $Q_1$ learning device 103 has a high convergence speed, it has a great convergence error. Accordingly, a residual in $Q_1$ learning device 103 which $Q_1$ learning device 103 has failed to cancel by learning $$(1-\alpha)(r + \gamma Q' - Q_1)$$

is used as a target value of learning performed by $Q_2$ learning device 105 so as to complement function of $Q_1$ learning device 103.

At the initial stage learning is performed rapidly by $Q_1$ learning device 103 and high learning speed is maintained for the whole period. After sufficient learning has been performed by $Q_1$ learning device 103, $Q_2$ learning device 105 starts to perform learning and therefore high convergence accuracy is ensured. Learning speed is determined based on time in which updated action value reaches neighborhood of the final convergence value.

According to the present embodiment, learning of $Q_1$ learning device 103 and learning by $Q_2$ learning device 105 are automatically performed in different ways. More particularly, action value $Q_1$ and action value $Q_2$ are updated according to updating rules of Expression (2) and Expression (3), respectively, and as a result, $Q_1$ learning device 103 and $Q_2$ learning device 105 are automatically operated in different ways.

When $Q_1$ learning device 103 obtains input information which has been acquired by the input information acquiring section 201 and has been processed by the input information processing section 203 at the current time, motion of other agents cannot be picked up from the input information at the current time. Accordingly, $Q_1$ learning device 103 can be grasped as a static object reinforcement learning device, which handles other agents that do not take an action by themselves and static objects. $Q_2$ learning device 105 receives information in which motion of other agents have been picked up using a predictor (a static other agent's state predictor) described later, and therefore can be grasped as a dynamic object reinforcement learning device, which handles other agents that take actions by themselves.

To generate input information to $Q_2$ learning device 105 which is a dynamic object reinforcement learning device, a static other agent's state predictor which predicts a state of an agent when the agent does not take an action may be used.

Figure 7:
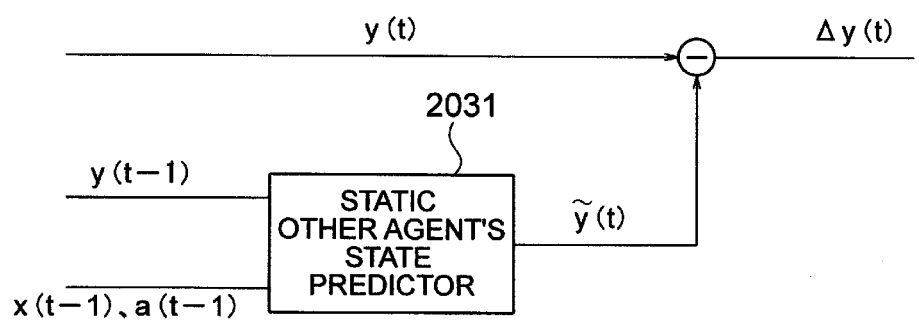
FIG. 7 illustrates a configuration of the static other agent's state predictor.

FIG. 7 illustrates a configuration of the static other agent's state predictor 2031. The static other agent's state predictor 2031 may be provided in the input information processing section 203. The static other agent's state predictor 2031 receives its own state x(t−1), its own action a(t−1) and the other agent's state y(t−1) at time t−1 and obtains a predicted value of the other agent's state at time t $$\tilde{y}(t).$$

By way of example, when the guiding robot 251 is moving and the guided robot 351 remains at rest, a predicted image of the camera of the guiding robot 251 which will change according to a change in the observing point is obtained by calculation. In general, a distance to the object and an angle between the direction to the object and the reference direction correspond to an image of the object. Accordingly, when a distance to the object and an angle between the direction to the object and the reference direction are determined, an image of the object can be obtained. Using a difference between a predicted value of the other agent's state at time t $$\tilde{y}(t)$$

and the other agent's state y(t) at time t, an action of the agent can be picked up. The input information processing section 203 can identify the state of the apparatus more appropriately using the other agent's state picked up by the static other agent's state predictor 2031 to supply the identified state to $Q_2$ learning device 105.

In an variation of embodiment, a learning system may be configured such that in addition to action value $Q_k$ which is determined by the other agent's state determined only by input information obtained at the current time, action value $Q_k'$ which is determined by the other agent's state determined by input information obtained at the current time and the other agent's action picked up as described above may be used. More particularly, the learning system may be configured such that the sum of action value $Q_k$ and action value $Q_k'$ may be used for learning. When the system is thus configured, the other agent's state is more effectively reflected on action values.

In the description given above, the input information processing section 203 is provided outside the learning control system 100. The input information processing section 203 may also be provided within the learning control system 100.

Figure 8:
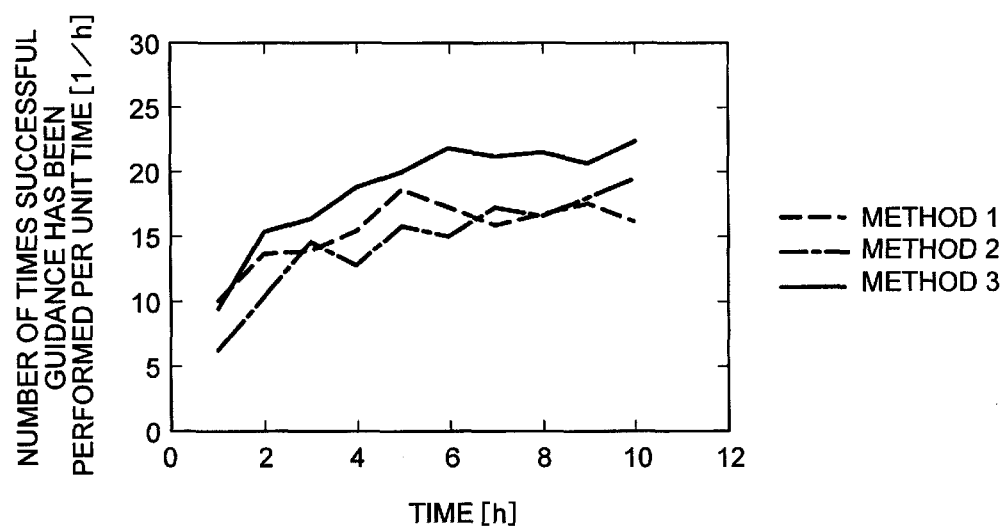
FIG. 8 is a graph showing the result of physical simulation of guiding task performed by the guiding robot.

FIG. 8 is a graph showing the result of physical simulation of guiding task performed by the guiding robot 251. The horizontal axis of the graph represents time. The vertical axis represents the number of times per unit time (an average of expected values) that the guiding robot 251 has successfully guided the guided robot 352 in the goal frame 355. "Method 1" shows the result obtained by conventional reinforcement learning in which a single learning device performs learning using only information on the environment, other agents and the apparatus itself. "Method 2" shows the result obtained by reinforcement learning in which a single learning device performs learning using information of the static other agent's state predictor in addition to the information used in Method 1. "Method 3" shows the result obtained by reinforcement learning in which $Q_1$ learning device 103 and $Q_2$ learning device 105 perform learning using the information used in Method 2. Method 3 shows the achieved level (the number of times per unit that successful guidance has been performed) higher than those of Method 1 and of Method 2. Further, the level of Method 3 at any time between the initial state and the final state is always higher than those of Method 1 and of Method 2.

Thus, according to the embodiments, a highly efficient reinforcement learning system and a highly efficient reinforcement learning method are obtained, which can be applied to the real environment including other agents without prior knowledge.

We claim:

1. An apparatus having a memory section and a learning control system, the learning control system performing learning of action values of actions of the apparatus which identifies its state as one of predetermined states, and selects an action based on the obtained action values and the identified state, the learning control system comprising:

n action value learning devices including the first to the n th learning devices which perform, using a computer and the memory section, learning of n action values from Q1 to Qn, respectively, assuming that n is a positive integer; and an action value determining device which determines, using the computer and the memory section, the total action value of an action Q of each state based on the n action values of the n action value learning devices, wherein the first target value of the first action value learning device is determined based on the reward r that is obtained after an action has been carried out by the next state and a total action value Q' that was prepared for the action selection in the next state, and the first learning device retrieves from the memory section and updates the first action value Q1 using the first target value, wherein when n is 2 or more, the n-th target value of the n th action value learning device is set to the difference between the (n−1) th target value of the (n−1) th learning device and the action value Qn−1, and the n th learning device retrieves from the memory section and updates the n th action value Qn using the n th target value, and wherein a learning coefficient, the n th target value and an update amount of action value Qn are represented respectively as αn, Tn and ΔQn, and the following expressions are held when n is two or more, $$\Delta Q_n = \alpha_n(T_n - A_n Q_n)$$
$$T_n = (1 - \alpha_{n-1})(T_{n-1} - A_{n-1}Q_{n-1})$$
$$A_n = \frac{\sum_p^n \alpha_p \prod_{q=1}^{p-1}(1-\alpha_q)}{\alpha_n}$$

wherein An is a coefficient for correcting Qn.

2. An apparatus having a memory section and a learning control system which performs learning of action value of the apparatus which identifies its state as one of predetermined states, and selects an action based on the obtained action values and the identified state, the learning control system comprising:

n action value learning devices including the first to the n th learning devices which perform, using a computer and the memory section, learning of n action values Q1 to Qn, respectively, assuming that n is a positive integer; and an action value determining device which determines action value of an action Q of each state based on the n action values of the n action value learning devices, wherein a target value of the total action value is determined based on the reward r obtained after an action has been carried out by the next state and action value Q' that was prepared for the action selection in the next state, wherein the n-th target value of the n th action value learning device is set to a value which is obtained by subtracting the sum of action values obtained by learning of action value learning devices other than the n th action value learning device from the target value of the total action value of an action, and the n th action value learning device updates the n th action value Qn using the n th target value, and wherein a learning coefficient, the n th target value and an update amount of action value Qn are represented respectively as αn, Tn, and ΔQn, which satisfy the following expressions:

$$\Delta Q_n = \alpha_n(T_n - Q_n)$$
$$T_n = T_0 - \sum_{k \neq n} Q_k.$$

3. An apparatus according to claim 1, wherein the apparatus identifies the state of the apparatus as one of predetermined states and obtains the reward r based on information on the environment, agents, and the apparatus itself.

4. An apparatus according to claim 3, wherein the apparatus further includes a static other agent's state predictor which predicts a state of an agent when the agent does not take an action, and an action of the agent is picked up using a difference between the agent's state which the static other agent's state predictor has predicted in the past and the agent's state obtained thorough information from the observation.

5. A learning control method in an apparatus having a memory section and a learning control system which identifies a state of the apparatus as one of predetermined states, obtains action values of actions in the identified state and selects an action based on the action values, wherein assuming that n is a positive integer, using a computer and the memory section, learning of n action values Q1 to Qn is performed and learning of the total action value of an action Q of each state is performed based on the n action values obtained by the learning, wherein the first target value is determined based on the reward r obtained after an action has been carried out and by the next state and action value Q' that was prepared for the action selection in the next state, and the first action value Q1 is updated using the first target value, and wherein when n is 2 or more, the n-th target value of the n th action value is set to the difference between the (n−1) th target value of the (n−1) th learning and the action value Qn−1, and the n th action value Qn is updated using the n th target value, and wherein a learning coefficient, the n th target value and an update amount of action value Qn are represented respectively as αn, Tn, and ΔQn, which satisfy the following expressions, when n is two or more:

$$\Delta Q_n = \alpha_n(T_n - A_n Q_n)$$
$$T_n = (1 - \alpha_{n-1})(T_{n-1} - A_{n-1}Q_{n-1})$$
$$A_n = \frac{\sum_p^n \alpha_p \prod_{q=1}^{p-1}(1-\alpha_q)}{\alpha_n}$$

wherein An is a coefficient for correcting Qn.

6. A learning control method in an apparatus having a memory section and a learning control system which identifies a state of the apparatus as one of predetermined states, obtains the action values of actions in the identified state and selects an action based on the action values, wherein assuming that n is a positive integer, using a computer and the memory section, learning of n action values $Q_1$ to $Q_n$ is performed and learning of the total action value of an action Q of each state is performed based on the n action values obtained by the learning, wherein a target value of the total action value is determined based on the reward r obtained after an action has been carried out by the next state and action value Q' that was prepared for the action selection in the next state, and wherein the n-th target value of the n th action value is set to a value which is obtained by subtracting the sum of action values obtained by learning of action values other than the n th action value from the target value of the total action value of an action, and the n th action value $Q_n$ is updated using the n th target value, and wherein a learning coefficient, the n th target value and an update amount of action value Qn are represented respectively as αn, Tn, and ΔQn, which satisfy the following expressions:

$$\Delta Q_n = \alpha_n (T_n - Q_n)$$

$$T_n = T_0 - \sum_{k \neq n} Q_k.$$

7. A learning control method according to claim 5, wherein the apparatus identifies a state of the apparatus as one of predetermined states and obtains the reward r based on information on the environment, agents, and the apparatus itself.

8. A learning control method according to claim 7, wherein a state of an agent is predicted when the agent does not take an action and an action of the agent is picked up using a difference between the agent's state which has been predicted in the past and the agent's state obtained thorough information from the observation.

9. A learning control method according to claim 8, wherein learning is performed using action value Qk that was determined from the agent's state determined based on input information at the current time and action value Qk' that was determined from the picked up action of the agent besides the agent's state determined based on the information at the current time alone.

* * * * *